(12) United States Patent
Nero, Jr. et al.

(10) Patent No.: US 6,285,744 B1
(45) Date of Patent: Sep. 4, 2001

(54) TELEPHONY TEST SYSTEM WITH ADJUSTABLE OUTPUT IMPEDANCE

(75) Inventors: Regis J. Nero, Jr., Export; Louis W. Hiener, III, Pittsburgh; Richard A. Bair, Jr., Brackenridge, all of PA (US); Frederick J. Kiko, Carlsbad, CA (US); Leo W. Manuel, II, San Diego, CA (US); Lester Mintzer, Santa Ana, CA (US)

(73) Assignee: Tollgrade Communications, Inc., Wilmington, DE (US)

( * ) Notice: Subject to any disclaimer, the term of this patent is extended or adjusted under 35 U.S.C. 154(b) by 0 days.

(21) Appl. No.: 09/402,693

(22) PCT Filed: Apr. 17, 1998

(86) PCT No.: PCT/US98/07613

§ 371 Date: Dec. 22, 1999

§ 102(e) Date: Dec. 22, 1999

(87) PCT Pub. No.: WO98/47272

PCT Pub. Date: Oct. 22, 1998

(30) Foreign Application Priority Data

Apr. 17, 1997 (US) .................................................. 60/043269

(51) Int. Cl.[7] .................................................. H04M 1/24
(52) U.S. Cl. .................................. 379/27; 379/1; 379/21; 379/30; 379/32
(58) Field of Search .............................. 379/1, 6, 12, 16, 379/18, 19, 21, 24, 26, 27, 28, 29, 30, 32, 34

(56) References Cited

U.S. PATENT DOCUMENTS

| | | | |
|---|---|---|---|
| 5,073,920 | * 12/1991 | Masukawa et al. | 379/30 |
| 5,347,225 | * 9/1994 | Graham | 379/30 |
| 5,404,388 | * 4/1995 | Eu | 379/27 |
| 5,465,287 | * 11/1995 | Egozi | 379/5 |
| 5,550,894 | * 8/1996 | Charland | 379/2 |
| 5,661,776 | * 8/1997 | Charland | 379/2 |
| 5,903,624 | * 5/1999 | Boswell et al. | 379/21 |

* cited by examiner

Primary Examiner—Binh K. Tieu
(74) Attorney, Agent, or Firm—Webb Ziesenheim Logsdon Orkin & Hanson, P.C.

(57) ABSTRACT

A telephone test system (2) includes a controller (4), a programmable gate array (PGA) (24) and a digital signal processor (DSP) (26) connected by a common bus (20). The PGA (24) includes an output connected to an input of a digital-to-analog converter (DAC) (36) and input connected to an output of an analog-to-digital converter (ADC) (32). A driver circuit (46) is connected between the DAC (36) and a telephone circuit (60) and between the ADC (32) and the telephone circuit (60). Under the control of the DSP (26), the driver circuit (46) generates voltages to the telephone circuit (60) and samples the response of the telephone circuit (60) to such generated voltages. The driver circuit (46) includes control inputs for receiving from the PGA (24) an impedance adjust signal (D) and a resistance adjust signal (R). An output impedance (124) of the driver circuit (46) connected to the telephone circuit (60) is adjustable as a function of the impedance adjust signal (D) and/or the resistance adjust signal (R).

16 Claims, 6 Drawing Sheets

TELEPHONY TEST SYSTEM WITH ADJUSTABLE OUTPUT IMPEDANCE

BACKGROUND OF THE INVENTION

1. Field of the Invention

The present invention relates to a telephony test system and, more particularly, a telephony test system having an adjustable output impedance.

2. Background Art

The telephone industry has evolved from providing "plain old telephone service" (POTS) to a communications industry providing a plurality of digital and analog communications mediums and protocols over the embedded telephone network. Telephone operating companies utilize local test systems to verify the operation of the embedded phone lines and/or telephone equipment connected to the telephone lines. These test systems typically include test devices deployed throughout the telephone network to test the telephone line and the equipment connected thereto, e.g., a subscriber's telephone.

Heretofore, the introduction of a new communication medium, telephony protocol and/or telephony equipment resulted in a unique test device being developed and deployed for testing the same. Hence, test devices evolved in a piecemeal manner such that, over time, each local test system potentially contained a significant number of expensive and inflexible test devices. As technology changes, the test requirements may also change and, therefore, many of the embedded test devices or test systems may not be capable of adapting or being adapted to a new test specification.

It is therefore an object of the present invention to provide a flexible and adaptable telephony test system to test all current telephone services and equipment, as well as many future or planned services or equipment. It is an object of the present invention to provide a test system having a programmably adjustable output impedance. It is an object of the present invention to provide a telephony test system adapted to test telephone circuits over a wide range of frequencies. These and other objects of the invention will become apparent to one of ordinary skill in the art upon reading the following description.

SUMMARY OF THE INVENTION

Accordingly, we have invented a testing apparatus for testing a telephone circuit. The testing apparatus includes a controller and a driver circuit having an input, an output and a control input adapted to receive an impedance adjust signal. A programmable gate array (PGA) connected between the controller and the driver circuit is adapted to receive program commands from the controller. A digital-to-analog converter (DAC) is connected between the PGA and the input of the driver circuit. The DAC generates an output voltage corresponding to data received by the DAC from the PGA. An analog-to-digital converter (ADC) is connected between the output of the driver circuit and the PGA. The ADC generates to the PGA data corresponding to a signal received at an input of the ADC. The signal received at the input of the ADC corresponds to a response of the telephone circuit to a voltage impressed thereon. In response to being programmed by the controller, the PGA controls the operation of the DAC and the ADC such that the ADC samples signals received at the input thereof in synchronization with the DAC generating signals to the driver circuit. The driver circuit generates on its output a voltage corresponding to the output voltage of the DAC received at the input of the driver circuit and the impedance adjust signal received at the control input. The output voltage generated by the driver circuit is impressed on the telephone circuit. The driver circuit adapts its output impedance as a function of the impedance adjust signal received at the control input.

The testing apparatus can include a digital signal processor (DSP) connected to the controller and PGA. The PGA provides to the DSP data corresponding to the data received by the PGA from the ADC. The DSP mathematically manipulates the data provided thereto from the PGA and reports the results of the mathematical manipulation to the controller. The PGA can provide a plurality of data to the DSP. The mathematical manipulation of data by the DSP can include performing a Fourier Transform on the plurality of data to obtain therefrom an indication of an amplitude and/or phase response of the telephone circuit to the output voltage generated to the telephone circuit by the driver circuit.

The driver circuit can include a first differential amplifier having an inverting input and a noninverting input. The noninverting input is adapted to receive a signal corresponding to a signal output by the DAC. The first differential amplifier has an output connected to an input of a multiplying DAC. The multiplying DAC has the control input which is adapted to receive the impedance adjust signal. A second differential amplifier has an inverting input and a noninverting input. The inverting input of the second differential amplifier is connected to the output of the multiplying DAC. A voltage amplifier has an input connected to an output of the second differential amplifier. A programmable resistor has an input connected to the output of the voltage amplifier, an output connected to the telephone circuit and a control input adapted to receive a resistance adjust signal. A programmable gain has an input connected to the telephone circuit and a control input adapted to receive a gain adjust signal. The ADC, the inverting input of the first differential amplifier and the noninverting input of the second differential amplifier are adapted to receive a signal corresponding to a signal generated at an output of the programmable gain. The programmable gain can be a resistor divider or an adjustable gain DAC. The programmable resistor can include a plurality of resistors connected in parallel between the voltage amplifier and the telephone circuit. Each resistor has a switch connected in series therewith. The resistance adjust signal received at the control input of the programmable resistor controls each of the plurality of switches to connect at least one of the plurality of switches between the high voltage amplifier and the telephone circuit.

The testing apparatus can include a wideband/TDR circuit having a second DAC that has an input connected to a bus which is connected between the controller and PGA and a second ADC having an output connected to the bus. The wideband/TDR circuit includes a splitter/combiner connectable between the DAC and the telephone circuit and between the ADC and the telephone circuit. A switch can be connected between the splitter/combiner and the telephone circuit and between the driver circuit and the telephone circuit. The switch has a control input adapted to receive a switch configure signal. In response to receiving the switch configure signal, the switch selectively connects the telephone circuit to the splitter/combiner or the driver circuit.

We have also invented a telephony test system for testing, a telephone circuit having a tip and a ring. The telephony test system includes a programmable gate array having a plurality of logic gates and a plurality of input/output pins. The logic gates are programmably configurable in an array configuration that is programmably connectable to the plurality of input/output pins of the PGA in a desired configuration. A controller is connected to the PGA via a bus. A DAC has an input connected to an output of the PGA. An ADC has an output connected to an input of the PGA. A first driver circuit has a first input connectable to an output of the DAC, a first output connectable to an input of the ADC, a second output connected to one of the tip and the ring and a second input connectable to the one of the tip and the ring. The first driver circuit also has a control input adapted to receive an impedance adjust signal. The controller causes the PGA to configure the plurality of logic gates in a desired array configuration, and causes the PGA to connect the desired array configuration and the plurality of input/output pins in a desired manner. As a function of the controller programming thereof, the PGA controls the DAC to generate an output voltage to the first driver circuit and controls the PGA to sample from the ADC a signal corresponding to an output voltage impressed on the one of the tip and the ring by the first driver circuit. The output voltage impressed on the one of the tip and the ring corresponds to the output voltage generated by the DAC and the impedance adjust signal received at the control input of the first driver circuit. The first driver circuit generates to the one of the tip and the ring an output impedance corresponding to the impedance adjust signal received at the control input.

The telephony test system can include a second driver circuit having a first input connectable to the output of the DAC, a first output connectable to the input of the ADC, a second output connected to the other of the tip and the ring and a second input connectable to the other of the tip and the ring. The second driver circuit has a control input adapted to receive another impedance adjust signal. A switch is connected between the DAC and the first inputs of the first and second driver circuits and between the first outputs of the first and second driver circuits and the input of the ADC. The switch has a control input adapted to receive a switch configure signal. In response to receiving the switch configure signal therefor, the switch selectively connects the output of the DAC to the first input of one of the first and second driver circuits and/or selectively connects the input of the ADC to the first output of one of the first and second driver circuits.

The telephony test system can include a transformer and a voice channel. The transformer has a first side connected in series between the second output of one the first and second driver circuits and the corresponding one of the tip and the ring. The voice channel has a first input and a first output connectable to the respective DAC and ADC via the switch. The voice channel has a second output and a second input connected across the second side of the transformer. In response to receiving the switch configure signal therefore, the switch selectively connects the first input of the voice channel and/or the first output of the voice channel to the respective DAC and ADC. Connecting the DAC to the first input of the voice channel enables audio frequency signals to be transmitted to the corresponding one of the tip and the ring via the transformer, and connecting the ADC to the first output of the voice channel enables audio frequency signals to be received from the corresponding one of the tip and the ring via the transformer.

The telephony test system can include a talk/monitor path including another telephone circuit having a tip and a ring. The tip and the ring of the other telephone circuit are selectively connectable to the respective DAC and ADC via the switch.

The telephony test system can include an alarm circuit connected between the PGA and an output alarm. The alarm circuit has an input adapted to monitor an alarm switch or a battery. The alarm circuit provides to the PGA a signal corresponding to a voltage of the battery or a state of the alarm switch. In response to the voltage of the battery being less than a desired voltage or the alarm switch being in a predetermined state, the PGA causes the alarm circuit to generate an alarm signal to the output alarm.

The telephony test system can include a control circuit connected to the PGA. The control circuit enables command and control signals to be communicated between the PGA and another system connected to the control circuit.

We have also invented a method of testing a tip and a ring of a telephone circuit for a DC delta connected equivalent circuit or an AC delta connected equivalent circuit. To test for the DC delta equivalent circuit, a first driver circuit impresses on the tip a first voltage and a second driver circuit impresses on the ring the first voltage. The output impedances of the first driver circuit and the second driver circuit are adjusted to the same value. The responses of the tip and ring to the first voltages are sampled and the first driver circuit impresses on the tip a second voltage, different than the first voltage, and the second driver circuit impresses on the ring the second voltage. The responses of the tip and ring to the second voltages are sampled and tip-to-ground resistances and ring-to-ground resistances are determined utilizing ratios of the sampled and applied voltages. A foreign tip voltage and a foreign ring voltage are also determined from a ratio of the sampled and applied voltages. The first driver circuit impresses on the tip a third voltage and the second driver circuit impresses on the ring a fourth voltage, where the third voltage and the fourth voltage are different. The response of the tip to the third and fourth voltages is sampled and a tip-to-ring current is determined utilizing the sampled voltages and the output impedances of the first and second voltage sources. The tip-to-ground resistance is determined from a difference in voltage between the tip and the ground and the tip-to-ring current.

To test for the AC delta connected equivalent circuit, the first driver circuit impresses on the tip a first AC voltage and the second driver circuit impresses on the ring the first AC voltage. The peak amplitudes of the first and second voltages are determined and the responses of the tip and the ring to the first AC voltages are sampled. A peak amplitude and phase for the tip voltage and a peak amplitude and phase for the ring voltage are determined. A tip-to-ground resistance is determined utilizing the output impedance of the first voltage source, the peak amplitude of the first voltage and the peak amplitude of the voltage measured at the tip. A tip-to-ground capacitance is determined utilizing the peak amplitude of the first voltage, the peak amplitude of the voltage measured at the tip and the output impedance of the first voltage source. A ring-to-ground resistance and a ring-to-ground capacitance are determined utilizing the source impedance of the second voltage source, the peak amplitude of the second voltage and the peak amplitude of the measured ring voltage. The amplitude of the first driver circuit is adjusted to an amplitude different than the amplitude of the second driver circuit. The responses of the tip and the ring to the voltages applied by the first and second driver circuits are sampled and a peak amplitude and phase of the sampled voltages are determined. A tip-to-ring resistance and a tip-to-ring capacitance are determined utilizing the ring voltage, the tip voltage, the output impedance of the first voltage source, the output impedance of the second voltage source and the ring-to-ground capacitance.

BRIEF DESCRIPTION OF THE DRAWINGS

FIG. 3b is a detailed schematic diagram of a programmable resistor of the driver circuit of FIG. 3a;

FIG. 4 is a schematic diagram of a wideband/TDR circuit of the telephony test system of FIG. 1;

DETAILED DESCRIPTION OF THE PREFERRED EMBODIMENTS

Figure 1:
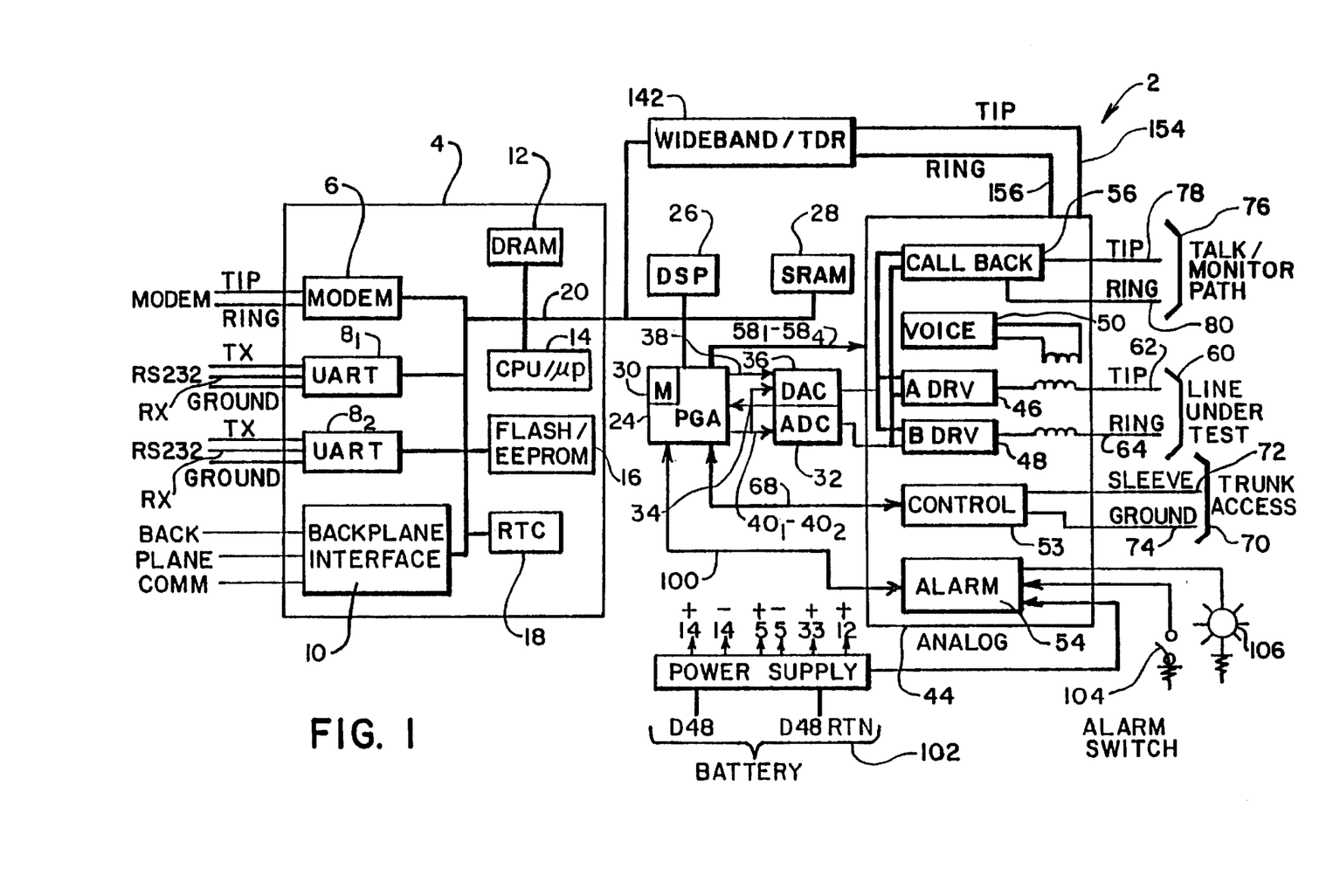
FIG. 1 is a schematic diagram of a telephony test system in accordance with the present invention.

With reference to FIG. 1, a telephony test system 2 includes a controller 4 having a modem 6, UARTs $8_1$ and $8_2$, a backplane interface 10, DRAM memory 12, a CPU/microprocessor 14, flash/EEPROM memory 16 and a real time clock 18 all connected by a common data/address bus 20 in a manner known in the art.

The test system 2 includes a field programmable gate array (PGA) 24, a digital signal processor (DSP) 26 and an SRAM memory 28 connected to the bus 20. The PGA 24 includes a plurality of internal logic gates and a plurality of input/output pins. The PGA 24 is initialized by the CPU 14 programmably configuring the logic gates in a desired array configuration, programmably connecting the array configuration to the plurality of input/output pins in a desired configuration and downloading into a memory 30 of the PGA 24 a control program. When initialized, the PGA 24 receives from the DSP 26 a start test signal which causes the PGA 24 to generate data to its output pins and receive data on its input pins in accordance with the array configuration and the control program stored in the memory 30. The DSP 26 is adapted to mathematically manipulate data supplied thereto. The DSP 26 includes one or more algorithms coded therein which manipulate data supplied to the DSP 26 in a predetermined manner. The DSP 26 receives from the PGA 24 data which is mathematically manipulated by the one or more algorithms coded in the DSP 26. The DSP 26 receives from the CPU 14 and/or the PGA 24 command and control signals which synchronize the receiving of data at the DSP 26 and which instruct the DSP 26 to manipulate the received data in accordance with one of the algorithms coded therein. Preferably, the DSP 26 controls the operation of the PGA 24, however, the CPU 14 can control the operation of the PGA 24, or the DSP 26 and the CPU 14 can coact to control the operation of the PGA 24.

The SRAM 28 is utilized as shared memory space between the PGA 24, the DSP 26 and the CPU 14. The SRAM 28 is utilized to convey data between the PGA 24, the DSP 26 and the CPU 14.

An analog-to-digital converter (ADC) 32 has an output connected to an input of the PGA 24 via data lines 34. A digital-to-analog converter (DAC) 36 has an input connected to an output of the PGA 24 via data lines 38. Control lines $40_1$ and $40_2$ extend from the PGA 24 to control inputs of the DAC 36 and the ADC 32, respectively, to enable the PGA 24 to synchronize the operation of the DAC 36 and the ADC 32.

An analog system 44 is connected to the PGA 24, the ADC 32 and the DAC 36. The analog system 44 includes an A driver circuit 46, a B driver circuit 48, a voice channel circuit 49, a control circuit 53, an alarm circuit 54 and a call back circuit 56. Connected between the PGA 24 and select circuits of the analog system 44 are control lines $58_1$–$58_4$.

The A driver circuit 46 and the B driver circuit 48 have an identical design, described hereinafter in greater detail, and are adapted to test a telephone circuit/line under test (LUT) 60 which includes a tip lead 62 connected to the A driver circuit 46 and a ring lead 64 connected to the B driver circuit 48. The voice channel circuit 49 includes a hybrid/filter circuit 50, an output amplifier 51 and an input amplifier 52. The hybrid/filter 50 enables bidirectional voice communication to occur on the tip lead 62 and the ring lead 64 simultaneously with the testing thereof by the driver circuits 46, 48 in a manner well known in the art. Connected between the PGA 24 and the control circuit 53 is a communication line 68 which is utilized to convey data and control signals therebetween. The control circuit 53 is connected to a trunk access circuit 70 having a sleeve lead 72 and a ground lead 74. The control circuit 53 enables data and control signals to be conveyed between the PGA 24 and one or more other systems connected to the trunk access circuit 70. The call back circuit 56 includes a tip lead 78 and a ring lead 80 of a talk/monitor path 76 which are connectable to the DAC 36 and the ADC 32, respectively. Connected between the PGA 24 and the alarm circuit 54 is a communication line 100 which is utilized to convey data and control signals therebetween. The alarm circuit 54 has an input connected to monitor a battery 102 of a power supply PS and an input connected to monitor a state of an alarm switch 104. The alarm circuit 54 has an output connected to an output alarm 106, such as lamp and/or an audio tone generator. The PGA 24 is connected to receive from the alarm circuit 54, a signal corresponding to the voltage of the battery 102 and/or the state of the alarm switch 104. In response to detecting the voltage of the battery 102 being less than a desired voltage and/or the alarm switch 104 being in a predetermined alarm state, the PGA 24 causes the alarm circuit 54 to generate an alarm signal to the output alarm 106.

Figure 2:
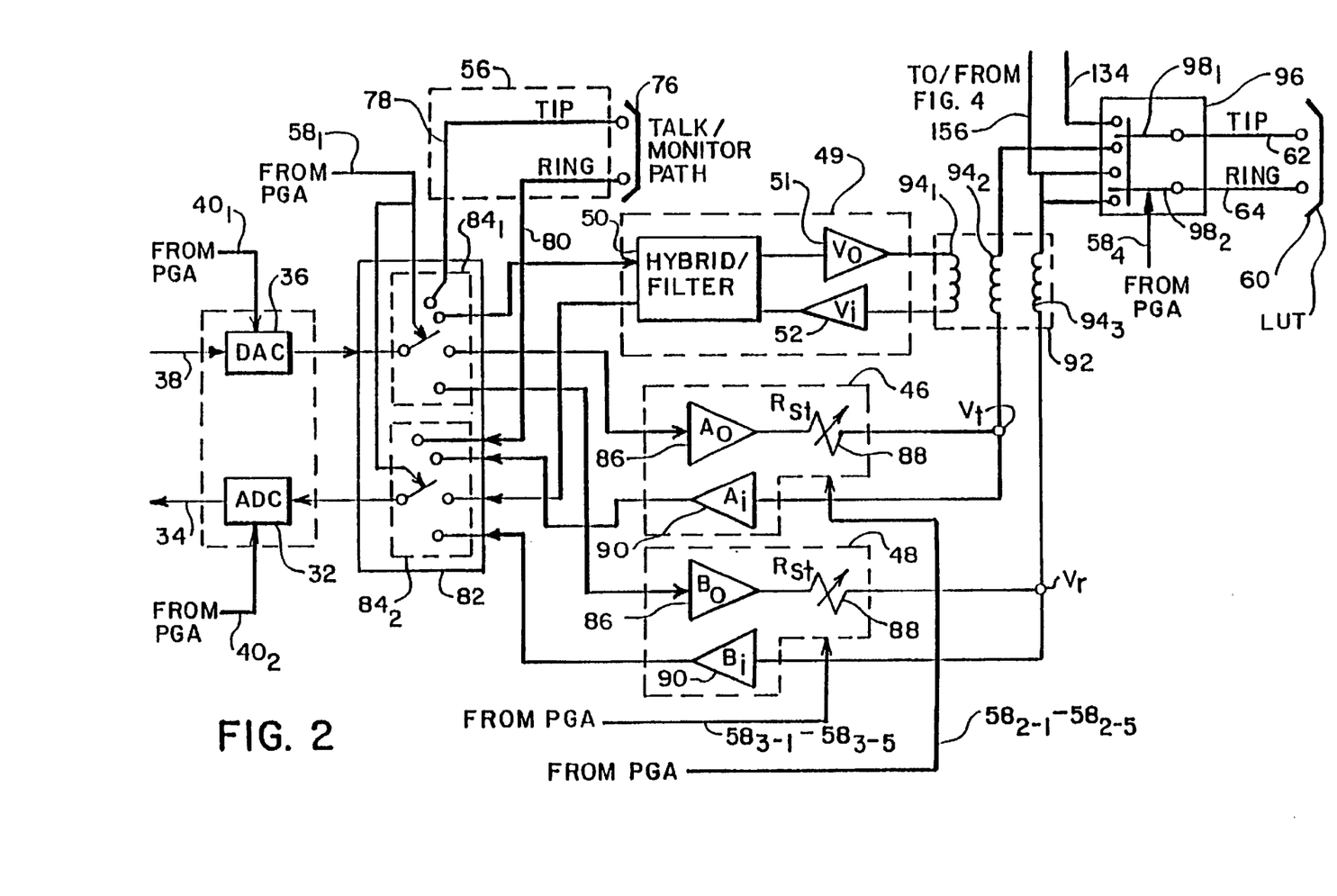
FIG. 2 is a schematic diagram of an A driver circuit, a B driver circuit, a voice channel circuit and a call back circuit of the telephony test system of FIG. 1.

With reference to FIG. 2 and with ongoing reference to FIG. 1, the analog system 44 includes a switch 82 having relays $84_1$ and $84_2$. The relays $84_1$ and $84_2$ are shown in FIG. 2 as mechanical relays for simplicity of illustration, however, the relays $84_1$ and $84_2$ are preferably semiconductor switches, such as FET transistors. The switch 82 has a control input adapted to receive from the PGA 24 via the control line 58, a control signal which causes the relay $84_1$ and/or the relay $84_2$ to switch to a desired state corresponding to the received control signal. The relay $84_1$ is adapted to selectively connect the DAC 36 to the A driver circuit 46, the B driver circuit 48, the voice channel circuit 50 or the call back circuit 56. Similarly, the relay $84_2$ is adapted to selectively connect the ADC 32 to the A driver circuit 46, the B driver circuit 48, the voice channel circuit 50 or the call back circuit 56.

The A driver circuit 46 and the B driver circuit 48 have an identical design which can be shown generally as including an output amplifier 86, an adjustable impedance 88 and an input amplifier 90. Connected between the A and B driver circuits 46, 48 and the tip lead 62 and the ring lead 64, respectively, is a transformer 92. The transformer 92 includes a coil 94, connected to the voice channel circuit 50 and coils $94_2$ and $94_3$ connected in series between the A and B driver circuits 46, 48 and the tip lead 62 and the ring lead 64, respectively. Connected between the coils $94_2$, $94_3$ and the tip lead 62 and the ring lead 64 is a switch 96 which includes relays $98_1$ and $98_2$, e.g., semiconductor relays, adapted to selectively connect the tip lead 62 and the ring lead 64 to the A driver circuit 46 and the B driver circuit 48, respectively, or a wideband/TDR circuit 142, to be discussed hereinafter in greater detail. The control lines $58_1$–$58_4$ are connected between the PGA 24 and control inputs of the switch 82, the A driver circuit 46, the B driver circuit 48 and the switch 96, respectively, to enable the PGA 24 to control and synchronize the various operations thereof.

Figure 3A:
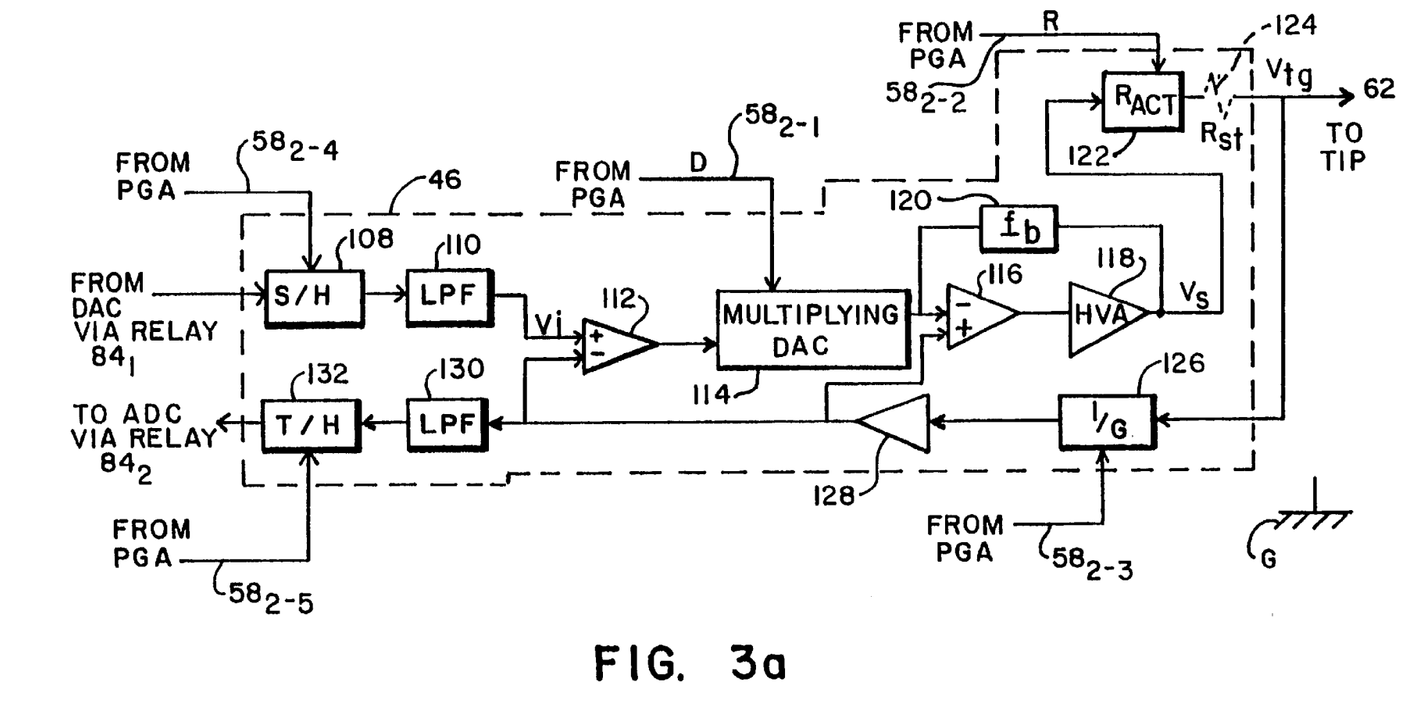
FIG. 3a is a detailed schematic diagram of one of the driver circuits of FIG. 2.
Figures 3B, 4:
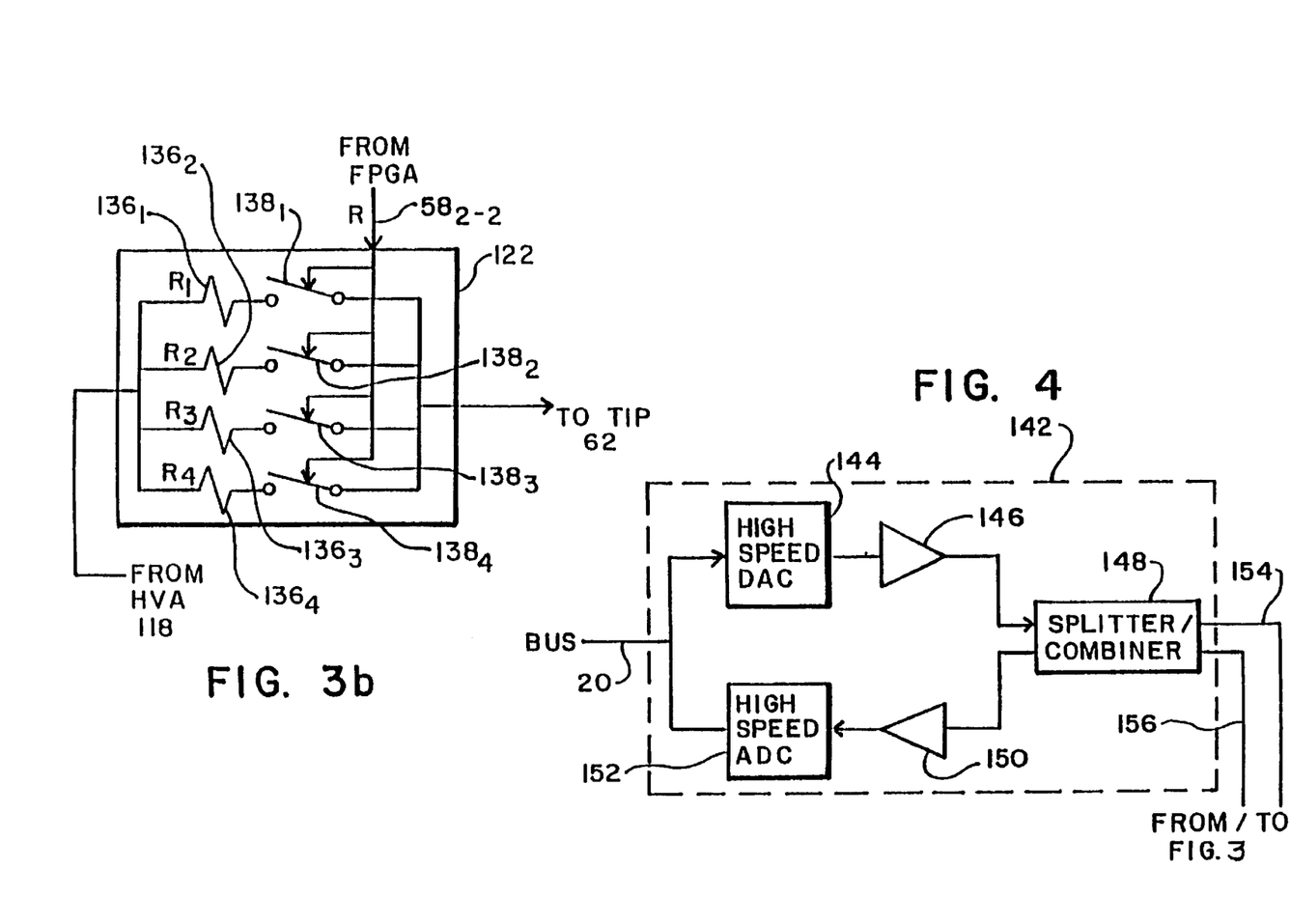

With reference to FIGS. 3a and 3b and with ongoing reference to FIGS. 1 and 2, since the A driver circuit 46 and the B driver circuit 48 are identical, the following description of the components and operations of the A driver circuit 46 is applicable to the components and operations of the B driver circuit 48. The A driver circuit 46 includes a sample and hold (S/H) 108 having an input connectable to an output of the DAC 36 via the relay $84_1$. The S/H 108 has a control input adapted to receive from the PGA 24 via the control line $58_{2-4}$ a sample signal therefor. The S/H 108 is adapted to generate on an output thereof a signal which corresponds to an output signal generated by the DAC 36 when the control input of the S/H 108 receives from the PGA 24 the sample signal. Stated differently, when the S/H 108 receives on its control input the sample signal from the PGA 24, the S/H 108 latches to its output a voltage corresponding to the voltage received at its input from the DAC 36. The S/H 108 maintains this voltage on its output until another sample signal is received at the control input of the S/H 108 from the PGA 24, regardless of changes in voltage on the input of the S/H 108. A low pass filter (LPF) 110 has an input connected to the output of the S/H 108 and an output connected to a noninverting input of a differential amplifier 112. A multiplying DAC 114 has an input connected to an output of the differential amplifier 112 and an output connected to an inverting input of a differential amplifier 116. The multiplying DAC 114 has a control input adapted to receive from the PGA 24 via a control line 5821 an impedance adjust signal D corresponding to the gain of the multiplying DAC 114. A high voltage amplifier (HVA) 118 has an input connected to an output of the differential amplifier 116 and an output connected to an input of a programmable resistor ($R_{ACT}$) 122. A feedback circuit ($f_b$) 120 is connected between the output of the HVA 118 and the noninverting input of the differential amplifier 116. The programmable resistor 122 has an output connected to the tip lead 62 and has a control input adapted to receive from the PGA 24 via control line $58_{2-2}$ a resistance adjust signal R. The output of the programmable resistor 122 is corrected to the tip lead 62 and provides thereto a tip voltage $V_t$. A feedback loop of the A driver circuit 46 includes a programmable gain circuit (1÷G) 126 having an input connected to the tip lead 62. The programmable gain circuit 126 has a control input adapted to receive from the PGA 24 via the control line $58_{2-3}$ a gain adjust signal. The gain adjust signal can be utilized to adjust the gain of the programmable gain circuit 126 as a function of the tip voltage $V_t$. Preferably, the programmable gain circuit 126 is formed from a resistor divider network or an adjustable gain DAC. A buffer amplifier 128 has an input connected to an output of the programmable gain circuit 126 and an output connected to the noninverting input of the differential amplifier 116 and the inverting input of the differential amplifier 112. A LPF 130 has an input connected to the output of the buffer amplifier 128 and an output connected to an input of a test and hold circuit (T/H) 132. The T/H 132 has a control input connected to receive from the PGA 24 via line $40_2$ a sample signal. An output of the T/H 132 is connectable to an input of the ADC 32 via the relay $84_2$ of the switch 82. The sample signal received at the control input of the T/H 132 causes a voltage received at the input of the T/H 132 to be latched to the output of the T/H 132. The T/H 132 maintains the voltage latched to its output until another sample signal is received at its control input. When another sample signal is received at the control input of the T/H 132, the voltage received at the input of the T/H 132 is latched to the output of the T/H 132.

The A driver circuit 46 synthesizes a source/output impedance as a function of the impedance adjust signal D received at the control input of the multiplying DAC 114 and the resistance adjust signal R received at the control input of the programmable resistor 122. More specifically, the output impedance ($R_{st}$) 124 is synthesized according to the following equation:

$$R_{st} = R_{ACT}(D \div x) \qquad \text{EQ1}$$

where $R_{st}$ = the output impedance 124;

$R_{ACT}$ = resistance of the programmable resistor 122;

D = impedance adjust signal from the PGA 24; and x = a predetermined programmable multiplier of the multiplying DAC 114.

The A driver circuit 46 generates a tip voltage $V_t$ as a function of the voltage $V_i$ received at the noninverting input of the differential amplifier 112 and as a function of the voltage $V_s$ output by the HVA 118. More specifically, the tip voltage $V_t$ is determined according to the following equation:

$$V_s V_t + (R_{ACT} \div R_{st})(V_t - V_t) \qquad \text{EQ2}$$

where isolating $V_t$ yields:

$$V_t = \frac{V_s - V_i\left(\frac{R_{ACT}}{R_{st}}\right)}{\left(1 - \frac{R_{ACT}}{R_{st}}\right)}$$

The components of the A driver circuit 46 generate a mathematical or synthetic source-to-tip voltage $V_{st}$. The synthetic tip voltage $V_{st}$ is determined according to the following equation:

$$V_{st} = y(V_t) \qquad \text{EQ3}$$

where y = gain multiplier of the A driver circuit.

In a preferred embodiment, the gain multiplier y is 50, however, other values of the gain multiplier can also be utilized.

The control lines $58_{2-1}$–$58_{2-5}$ extending from the PGA 24 to the A driver circuit 46 enable the PGA 24 to control the various operations of the multiplying DAC 114, the programmable resistor 122, the programmable gain circuit 126, the S/H 108 and the T/H 132, respectively, of the A driver circuit 46. Similarly, the control lines $58_{3-1}$–$58_{3-5}$ extending from the PGA 24 to the B driver circuit 48 enable the PGA 24 to control the various operations of the multiplying DAC 114, the programmable resistor 122, the programmable gain circuit 126, the S/H 108 and the T/H 132, respectively, of the B driver circuit 48.

As shown in FIG. 3b, the programmable resistor 122 includes a plurality of resistors $136_1$–$136_4$, connected in parallel between the HVA 118 and the tip lead 62. Each resistor 136$_1$–136$_4$ has connected in series therewith a relay 138$_1$–138$_4$, respectively. The resistance adjust signal R received at the control input of the programmable resistor 122 of the A driver circuit 46 via the control line 58$_{2-2}$ controls each of the plurality of relays 138$_1$ 138$_4$ to connect one or more of the resistors 136$_1$–136$_4$ between the HVA 118 and the tip lead 62. The relays 138$_1$–138$_4$ are shown in FIG. 3b as mechanical relays, however, the relays 138$_1$ 138$_4$ can also be semiconductor relays.

With reference to FIG. 4 and with ongoing reference to FIG. 1, the test system 2 preferably includes the wideband/TDR circuit 142. The wideband/TDR circuit 142 includes a high speed DAC 144 having an input connected to the bus 20 and an output connected to a buffer amplifier 146. The buffer amplifier 146 has an output connected to an input of a splitter/combiner 148 which has an output connected to an input of a buffer amplifier 150. The buffer amplifier 150 has an output connected to an input of a high speed ADC 152 which has an output connected to the bus 20. The splitter/combiner 148 includes circuitry (not shown) which enables a signal from the buffer amplifier 146 to be supplied to a tip lead 154 and a signal on the ring lead 156 to be received at the buffer amplifier 150. As shown in FIG. 2, the tip lead 154 and the ring lead 156 are connectable to the tip lead 62 and the ring lead 64 via the relays 98$_1$, 98$_2$, respectively, of the switch 96. The switch 96 includes a control input adapted to receive via the control line 58$_4$ a control signal which causes the relays 98$_1$ and 98$_2$ to selectively connect the tip lead 62 and the ring lead 64 to the A driver circuit 46 and the B driver circuit 48 or the tip lead 154 and the ring lead 156, respectively.

In operation, the A driver circuit 46 and the B driver circuit 48 of the test systems 2 are connected to the tip lead 62 and the ring lead 64, respectively. The CPU 14 receives a test command signal via the modem 6, the UARTS 8$_1$ or 8$_2$, or the back plane interface 10. In response to receiving the test command signal, the CPU 14 initializes the PGA 24 and transmits a test start command to the DSP 26 to perform one or more tests corresponding to the test command signal. The programmably configurable logic gates and input/output pins of the PGA 24 enable the DSP 26 to control the operation of the DAC 36, the ADC 32 and various select components of the analog system 44 in a desired manner to conduct the one or more tests of the tip lead 62, the ring lead 64 and/or equipment connected to the tip lead 62 and the ring lead 64. More specifically, the DSP 26 supervises the operation of the PGA 24 to control the DAC 36 and the A and B driver circuits 46, 48 to generate desired DC or AC voltage waveforms to the tip lead 62 and the ring lead 64 at desired synthesized output impedances ($R_{st}$, $R_{sr}$) 124. Moreover, the PGA 24 synchronizes the operation of the ADC 32, the A driver circuit 46 and the B driver circuit 48 to detect the response of the tip lead 62 and/or the ring lead 64 to such generated voltages.

Since the A and B driver circuits 46, 48 can synthesize their respective output impedances ($R_{st}$, $R_{sr}$) 124, the test system 2 can adjust the output impedances ($R_{st}$ $R_{sr}$) 124 of the A and B driver circuits 46, 48 to match the impedances appearing on the tip lead 62 and ring lead 64. To detect if the synthesized output impedance ($R_{st}$ $R_{sr}$) 124 of the A driver circuit 46 matches the impedance appearing on the tip lead 62, the DSP 26 causes the A driver circuit 46 to generate the synthetic tip voltage $V_{st}$. The DSP 26 causes the ADC 32 to sample from the A driver circuit 46 a tip-to-ground voltage $V_{tg}$ corresponding to the response of the tip lead 62 to the generation of the synthetic tip voltage $V_{st}$. With the S/H 108 maintaining a constant output voltage, the DSP 26 adjusts the gain of the multiplying DAC 114 by causing the PGA 24 to supply to the control input thereof a plurality of different impedance adjust signals D. Moreover, the DSP 26 can adjust the value of the programmable resistor 122 by causing the PGA 24 to supply to the control input thereof different resistance adjust signals R. The different resistance adjust signals R supplied to the programmable resistor 122 cause the relays 138$_1$–138$_4$ to switch to a state corresponding thereto thereby connecting one or more of the resistors 136$_1$–36$_4$ between the output of the HVA 118 and the tip lead 62. Each different impedance adjust signal D and/or resistance adjust signal R produces a different unique synthetic tip voltage $V_{st}$. For each different impedance adjust signal D and/or resistance adjust signal R, the DSP 26 causes the ADC 32 to sample from the A driver circuit 46 the tip-to-ground voltage $V_{tg}$ corresponding to the response of the tip lead 62 to the generation of the synthetic tip voltage $V_{st}$. Preferably, the output impedance ($R_{st}$) 124 matches the impedance appearing on the tip lead 62 when $V_{tg}=(0.5)(V_{st})$. The value of the impedance adjust signal D supplied to the multiplying DAC 114 and the value of the resistance adjust signal R supplied to the programmable resistor 122 corresponding to the maximum tip-to-ground voltage $V_{tg}$ can be utilized to determine the output impedance 124 that matches, or most closely matches, the impedance appearing on the tip lead 62. Similarly, the synthesized output impedance 124 of the B driver circuit 48 can be adjusted to match, or closely match, the impedance appearing on the ring lead 64. Since the A driver circuit 46 and the B driver circuit 48 are independently controllable by the DSP 26 via the PGA 24, the output impedance ($R_{st}$) 124 of the A driver circuit 46 and the output impedance ($R_{sr}$) 124 of the B driver circuit 48 can be adjusted independent of each other.

As discussed above, the S/H 108 of the A driver circuit 46 and the S/H 108 of the B driver circuit 48 can generate continuous voltage outputs corresponding to the output of the DAC 36 when connected thereby when the sample signals are received thereby. The DSP 26 controls the voltage output by the A driver circuit 46 and the B driver circuit 48 by controllably switching the relay 84$_1$ and selectively connecting the DAC 36 to the A driver circuit 46 or the B driver circuit 48. The DSP 26 can cause the relay 84$_1$ to switch between the A driver circuit 46 and the B driver circuit 48 at a sufficient rate so that the A driver circuit 46 and the B driver circuit 48 generate a DC or AC synthetic voltage $V_{st}$ and generate a DC or AC synthetic ring voltage $V_{sr}$, respectively, at substantially the same time. To compensate for delays in switching the DAC 36 between the A driver circuit 46 and the B driver circuit 48 when generating AC synthetic voltage waveforms, the DSP 26 can phase shift the output of the DAC 36 supplied to one of the A driver circuit 46 and the B driver circuit 48. In this manner, the A driver circuit 46 and the B driver circuit 48 can generate AC synthetic voltage waveforms that are in phase. To avoid the synthetic tip voltage $V_{st}$ and/or the synthetic ring voltage $V_{sr}$ from having ripple thereon caused by switching the output of the DAC 36 between the respective A driver circuit 46 and the B driver circuit 48, the output of each S/H 108 is received at the input to its corresponding LPF 110 which filters any ripple therefrom. The A and B driver circuits 46, 48 each include the T/Hs 132 which are switchably connected to the ADC 32 via the relay 84$_2$. Each T/H 132 samples from its corresponding LPF 130 a voltage corresponding to the response of the tip lead 62 and the ring lead 64, i.e., $V_{tg}$ and $V_{rg}$, to the generation of the respective synthetic tip voltage $V_{st}$ and the synthetic ring voltage $V_{sr}$.

At suitable times, the ADC is multiplexed into communication with a corresponding T/H 132 for obtaining therefrom a voltage corresponding to the response of the tip lead 62 and the ring lead 64 to the generation of the respective synthetic tip voltage $V_{st}$ and synthetic ring voltage $V_{sr}$.

Figure 5:
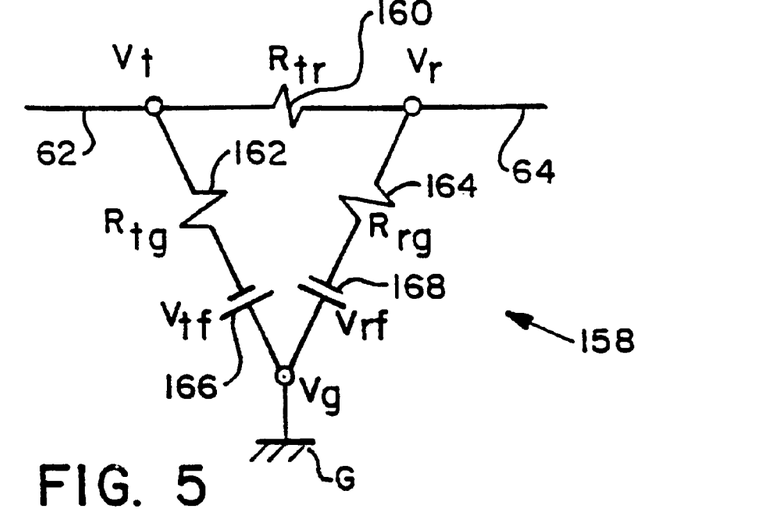
FIG. 5 is a tip-to-ring DC delta equivalent circuit having resistance and foreign voltage values that can be determined utilizing the telephony test system of FIG. 1.

With reference to FIG. 5, the above-described test system 2 can be utilized to test the tip lead 62 and the ring lead 64 for a DC equivalent circuit 158. The DC equivalent circuit 158 is shown in FIG. 5 as having a tip-to-ring resistance 160, a tip-to-ground resistance 162 and a ring-to-ground resistance 164 connected in a delta configuration. Moreover, the DC equivalent circuit 158 includes a foreign tip voltage ($V_{tf}$) 166, shown schematically as a voltage source connected between the tip lead 62 and a system ground G, and a foreign ring voltage ($V_{rf}$) 168, shown schematically as a voltage source connected between ring lead 64 and the system ground G.

With reference back to FIG. 2 and with ongoing reference to FIG. 5, in operation the CPU 14 initializes the PGA 24 and transmits a test start signal to the DSP 26 causes the PGA 24 to initiate testing of the tip lead 62 and/or the ring lead 64. The DSP 26 initializes the switches 82, 96 so that the output of the DAC 36 is connected to the A driver circuit 46, and the tip lead 62 and the ring lead 64 are connected to the A driver circuit 46 and the B driver circuit 48, respectively. The DSP 26 causes the PGA 24 to transmit an impedance adjust signal D and the resistance adjust signal R to each of the A and B driver circuits 46, 48. The impedance adjust signal D and the resistance adjust signal R received by the A driver circuit 46 establish a value of the output impedance ($R_{st}$) 124. Similarly, the impedance adjust signal D and the resistance adjust signal R received by the B driver circuit 48 establishes a value of the output impedance ($R_{sr}$) 124. Preferably, the output impedance ($R_{st}$) 124 synthesized by the A driver circuit 46 is the same as the output impedance ($R_{sr}$) 124 synthesized by the B driver circuit 48.

The DSP 26 causes the PGA 24 to transmit data to the input of the DAC 36 via data line 38 and transmits a sample signal to the DAC 36 via control line $40_1$. The sample signal received by the DAC 36 causes the DAC 36 to convert the data into an output voltage which is supplied to the A driver circuit 46 via the relay $84_1$. In response to receiving a control signal from the PGA 24 via control line $58_{2\text{-}4}$, the S/H 108 of the A driver circuit 46 latches to its output a voltage received at its input from the DAC 36. The PGA 24 signals the relay $84_1$ on the control line $5_1$ to connect the DAC 36 to the S/H 108 of the B driver circuit 48. When the output of the DAC 36 is connected to the input of the S/H 108 of the B driver circuit 48, the PGA 24 signals the S/H 108 of the B driver circuit 48 via the control line $58_{3\text{-}4}$ to latch to its output a voltage received at its input from the DAC 36. In response to the A driver circuit 46 and the B driver circuit 48 being individually connected to the output of the DAC 36, the A and B driver circuits 46, 48 generate a DC synthetic tip voltage $V_{st1}$ and generate a DC synthetic ring voltage $V_{sr1}$, respectively, with the voltage $V_{st1}$ equal to the voltage $V_{sr1}$. The PGA 24 causes the T/Hs 132 of the A and B driver circuits 46, 48 to individually sample a tip-to-ground voltage $V_{tg1}$ and a ring-to-ground voltage $V_{rg1}$ corresponding to the voltages $V_{st1}$ and $V_{sr1}$, respectively. The tip-to-ground voltage $V_{tg1}$ and the ring-to-ground voltage $V_{rg1}$ correspond to the responses of the tip lead 62 and the ring lead 64 to the synthetic tip voltage $V_{st1}$ and the synthetic ring voltage $V_{sr1}$. The DSP 26 then causes the A and B driver circuits 46, 48 to generate a DC synthetic tip voltage $V_{st2}$ and generate a DC synthetic ring voltage $V_{sr2}$, respectively, with the voltage $V_{st2}$ equal to the voltage $V_{sr2}$. The PGA 24 then causes the T/Hs 132 of the A and B driver circuits 46, 48 to sample a tip-to-ground voltage $V_{tg2}$ and a ring-to-ground voltage $V_{rg2}$, respectively. The DSP 26 determines a ratio $\alpha_t = (V_{tg1} - V_{tg2}) \div (V_{st1} \div V_{st2})$; a ratio $\alpha_r = (V_{rg1} - V_{rg2}) \div (V_{sr1} - V_{sr2})$; a tip-to-ground resistance $R_{tg} = \alpha_t(R_{st}) \div (1 - \alpha_t)$; and a ring-to-ground resistance $R_{rg} = \alpha_r(R_{sr}) \div (1 - \alpha a_r)$. The DSP 26 also determines the foreign tip-to-ground voltage $V_{tf} = (V_{tg1} - \alpha_t(V_{st1})) \div (1 - \alpha_t)$ and the foreign ring-to-ground voltage $V_{rf} = (V_{rg1} - \alpha_r(V_{sr1})) \div (1 - \alpha_r)$. Next, the DSP 26 causes the S/Hs 108 of the A and B driver circuits 46, 48 to generate a DC synthetic tip voltage $V_{st3}$ and to generate a DC synthetic ring voltage $V_{sr3}$, where the voltage $V_{st3}$ and the voltage $V_{sr3}$ are different and preferably, one of the voltages $V_{st3}$ and $V_{sr3}$ is 0 volts. The DSP 26 then causes the T/Hs 132 of the A and B driver circuits 46, 48 to sample a tip-to-ground voltage $V_{tg3}$ and a ring-to-ground voltage $V_{rg3}$, respectively. The DSP 26 determines a tip-to-ring current $I_{tr} = ((V_{st3} - V_{tg3}) \div R_{st})((V_{tg3} - V_{tf}) \div R_{tg})$ and determines the tip-to-ring resistance $R_{tr} = (V_{tg3} - V_{rg3}) \div I_{tr}$.

Figure 6:
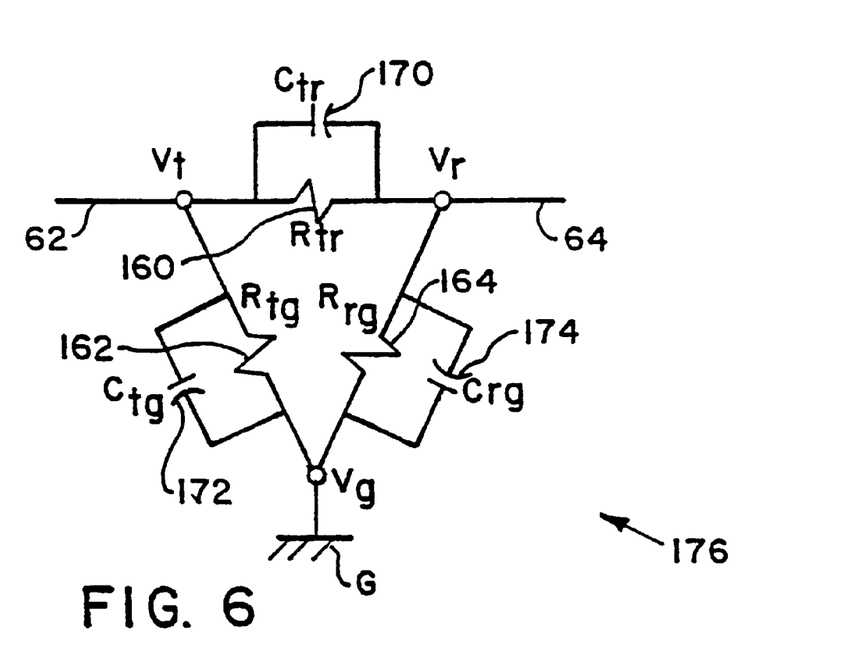
FIG. 6 is an AC delta connected equivalent circuit having resistance and capacitive values that can be determined utilizing the telephony test system of FIG. 1.

With reference to FIG. 6 and with ongoing reference to FIGS. 1–3b, the test system 2 can be utilized to test for an AC equivalent circuit 176 which includes the resistors 160, 162 and 164, discussed above in connection with the DC equivalent circuit 158 shown in FIG. 5. However, the AC equivalent circuit 176 also includes capacitors 170, 172 and 174 connected in parallel with the resistors 160, 162 and 164, respectively. To determine the AC equivalent circuit values for the resistors 160, 162 and 164 and capacitors 170, 172 and 174, the DSP 26 causes the A and B driver circuits 46, 48 to generate the AC synthetic voltage $V_{st1}$ and the AC synthetic voltage $V_{sr1}$, respectively. The frequency, amplitude and phase of the AC voltages $V_{st1}$ and $V_{sr1}$ are the same and the output impedances ($R_{st}$ and $R_{sr}$) 124 of the A and B driver circuits 46, 48 are preferably the same. Preferably, the voltages $V_{st1}$, and $V_{sr1}$ are 24 Hz RMS in-phase sine waves. The DSP 26 determines a peak amplitude of the AC voltages $V_{st1}$ and $V_{sr1}$ and causes the ADC 32 to sample from the T/Hs 132 of the respective A and B driver circuits 46, 48 the AC tip-to-ground voltage $V_{tg1}$ and the AC ring-to-ground voltage $V_{rg1}$ corresponding to the voltage $V_{st1}$ and $V_{sr1}$. Utilizing the sampled voltages $V_{tg1}$ and $V_{rg1}$, the DSP 26 determines therefor a peak amplitude $|V_{tg1}|$ and phase $\theta_{tg1}$, and a peak amplitude $|V_{rg1}|$ and phase $\theta_{rg1}$, respectively. Utilizing the output impedance ($R_{st}$) 124 of the A driver circuit 46 (determined from the values of the impedance adjust signal D and the resistance adjust signal R), the DSP 26 determines the tip-to-ground resistance $R_{tg} = R_{st} \div ((|V_{st1}| \div |V_{tg1}|) \cos \theta_{tg1} - 1)$ and determines the tip-to-ground capacitance $C_{tg} = -|V_{st1}| \sin \theta_{tg1} \div |V_{tg1}| \omega R_{st}$, where $\omega$ is $= (2\pi)$ (the frequency of $V_s$). Utilizing the output impedance ($R_{sr}$) 124 of the B driver circuit 48, the DSP 26 determines a ring-to-ground resistance $R_{rg} = R_{sr} \div ((|V_{sr1}| \div |V_{rg1}|) \cos \theta_{rg1} - 1)$ and determines the ring-to-ground capacitance $C_{rg} = -|V_{sr1}| \sin \theta_{rg1} \div |V_{rg1}| \omega R_{sr}$. The DSP 26 then causes the A and B driver circuits 46, 48 to generate the AC synthetic voltage $V_{st2}$ and an AC synthetic voltage $V_{sr2}$, respectively, with the amplitudes of $V_{st2}$ and $V_{sr2}$ different and with the output impedance ($R_{st}$) 124 equal to the output impedance ($R_{sr}$) 124. With the amplitudes of $V_{sr2}$ and $V_{st2}$ different, the PGA 24 causes the ADC 32 to sample the tip-to-ground AC voltage $V_{tg2}$ and the ring-to-ground AC voltage $V_{rg2}$. The DSP 26 determines for the tip-to-ground AC voltage $V_{tg2}$ a peak amplitude $|V_{tg2}|$ and phase $\theta_{tg2}$ and determines for the ring-to-ground AC voltage $V_{rg2}$, a peak amplitude $|V_{rg2}|$ and phase $\theta_{rg2}$. The DSP 26 then determines a source-to-ring conductance $G_{sr} = 1 \div R_{sr}$, and determines a ring-to-ground admittance $Y_{rg} = (\text{Re})Y_{rg} + j(\text{Im})Y_{rg} = (1 \div R_{rg}) + j\omega C_{rg}$, with (Re)$Y_{rg}$=real component of $Y_{rg}$ and (Im)$Y_{rg}$=imaginary component of $Y_{rg}$. The DSP 26 then determines a tip-to-ring admittance $$Y_{tr} = (Re)Y_{tr} + j(Im)Y_{tr} = |Y_{tr}|\cos\theta_{Y_{tr}} + j|Y_{tr}|\sin\theta_{Y_{tr}}, \quad \text{where}$$

$$|Y_{tr}| = \frac{|Y_{tg}|\sqrt{((Re)Y_{rg} + G_{sr})^2 + (Im)Y_{rg}^2}}{\sqrt{(|V_{tg}|\cos\theta_{tg} - |V_{rg}|\cos\theta_{rg})^2 + (|V_{tg}|\sin\theta_{tg} - |V_{rg}|\sin\theta_{rg})^2}}$$

and $$\theta_{Y_{tr}} = \frac{\theta_{tg} + \tan^{-1}\left[\frac{(Im)Y_{rg}}{(Re)Y_{rg} + G_{sr}}\right]}{\tan^{-1}\left[\frac{|V_{tg}|\sin\theta_{tg} - |V_{rg}|\sin\theta_{rg}}{|V_{tg}|\cos\theta_{tg} - |V_{rg}|\cos\theta_{rg}}\right]}$$

Utilizing the tip-to-ring admittance $Y_{tr}$, the DSP 26 determines a tip-to-ring resistance $R_{tr}=1\div(Re)Y_{tr}$, where (Re) $Y_{tr}$=the real component of $Y_{tr}$. Moreover, utilizing the tip-to-ring admittance $Y_{tr}$, the DSP 26 determines the tip-to-ring capacitance $C_{tr}=(Im)Y_{tr}\div\omega$, where (Im)$Y_{tr}$=the imaginary component of $Y_{tr}$.

Preferably, the DSP 26 controls the ADC 32 to obtain for each signal sampled thereby a plurality of samples. The PGA 24 provides to the DSP 26 a plurality of data corresponding to the plurality of sampled signals. The DSP 26 mathematically manipulates the plurality of data by performing thereon a Fourier Transform to obtain an indication therefrom a DC value for each signal for the DC equivalent circuit 158 or the amplitude and phase of each AC signal obtained for the AC equivalent circuit 176. These values are utilized to obtain the values for the resistors 160, 162 and 164 and the foreign voltage values 166, 168 for the DC equivalent circuit 158 and the values for the resistors 160, 162 and 164 and the capacitors 170, 172, 174 of the AC equivalent circuit 176 in the above-described manner.

With reference to FIGS. 1 and 4, the wideband/TDR circuit 142 is utilized to convey and receive wideband signals from the tip lead 62 and the ring lead 64. These wideband signals can include signals of suitable waveform for testing the tip lead 62 and the ring lead 64 utilizing time domain reflectomatry or other wideband testing techniques.

Figure 7:
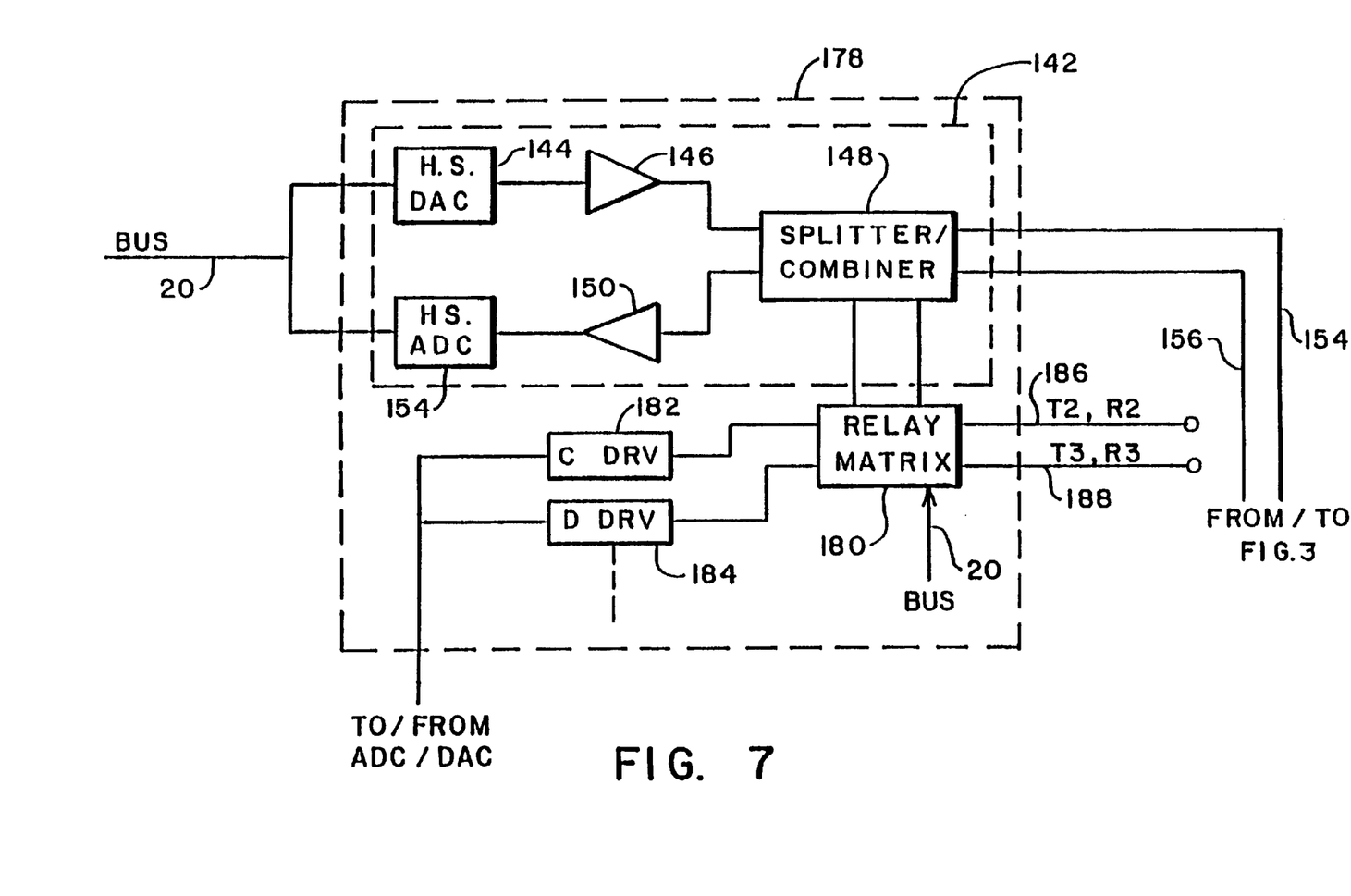
FIG. 7 is a schematic diagram of a daughter board that includes the wideband/TDR circuit of FIG. 4, additional driver circuits and a relay matrix which enables the wideband/TDR circuit or the additional driver circuits to be selectively connected to other telephone circuits.

With reference to FIG. 7 and with ongoing reference to FIGS. 1–4, the wideband/TDR circuit 142 can be incorporated onto a daughter board 178 which can include additional driver circuits, e.g., a C driver circuit 182 and a D driver circuit 184, etc., similar to the A and B driver circuits 46, 48. A relay matrix 180 can be connected to the additional C and D driver circuits 182, 184 and the splitter/combiner 148. The relay matrix 180 can include a control input connected to receive control signals from the bus 20 which cause relays (not shown) of the relay matrix to adjust to a desired pattern to connect the additional drivers 182, 184 or the splitter/combiner 148 to other tip-ring pairs 186, 188 for testing thereof.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

What is claimed is:

1. A telephony test system for testing a telephone circuit having a tip and a ring, the telephony test system comprising:

a programmable gate array (PGA) having a plurality of logic gates and a plurality of input/output pins, with the logic gates programmably configurable in an array configuration, with the array configuration programmably connectable to the plurality of input/output pins of the PGA;

a controller connected to the PGA via a bus;

a digital-to-analog converter (DAC) having an input connected to an output of the PGA;

an analog-to-digital converter (ADC) having an output connected to an input of the PGA; and a first driver circuit having a first input connectable to an output of the DAC, a first output connectable to an input of the ADC, a second output connected to one of the tip and the ring and a second input connectable to the one of the tip and the ring, with the first driver circuit having a control input adapted to receive an impedance adjust signal, wherein:

the controller causes the PGA to configure the plurality of logic gates in a desired array configuration, and causes the PGA to connect the desired array configuration and the plurality of input/output pins in a desired manner;

as a function of the controller programming thereof, the PGA controls the DAC to generate an output voltage to the first driver circuit and controls the ADC to sample from the PGA a signal corresponding to a signal impressed on the one of the tip and the ring;

the first driver circuit generates to the one of the tip and the ring a voltage corresponding to the output voltage generated by the DAC and the impedance adjust signal received at the control input; and the first driver circuit generates to the one of the tip and the ring an output impedance corresponding to the impedance adjust signal received at the control input.

2. The telephony test system as set forth in claim 1, further including a digital signal processor (DSP) connected to the controller and the PGA via the bus, wherein:

the PGA synchronizes the generation of the output voltage by the DAC and the sampling of the signal by the ADC;

the DSP receives from the PGA data corresponding to the signal sampled by the ADC;

the DSP mathematically manipulates the data received thereby from the PGA in a predetermined manner; and the DSP provides to the controller the results of the mathematical manipulation.

3. The telephony test system as set forth in claim 1, further including:

a second driver circuit having a first input connectable to the output of the DAC, a first output connectable to the input of the ADC, a second output connectable to the other of the tip and the ring and a second input connectable to the other of the tip and the ring, with the second driver circuit having a control input adapted to receive another impedance adjust signal; and a first switch connected between the DAC and the first inputs of the first and second driver circuits, and connected between the first outputs of the first and second driver circuits and the input of the ADC, with the first switch having a control input adapted to receive a first switch configure signal, wherein in response to receiving the first switch configure signal the first switch selectively connects the output of the DAC to the first input of one of the first and second driver circuits, and selectively connects the input of the ADC to the first output of one of the first and second driver circuits.

4. The telephony test system as set forth in claim 3, wherein a first driver circuit network and a second driver circuit network each include:
- a multiplying DAC having an input adapted to receive a signal corresponding to a signal output by the DAC, with the multiplying DAC having the control input adapted to receive the impedance adjust signal; and
- a programmable resistor having an input adapted to receive a signal corresponding to an output of the DAC and an output connected to the corresponding one of the tip and the ring, with the programmable resistor having a plurality of resistors and a control input adapted to receive a resistance adjust signal, with the plurality of resistors adapted to be connected in a desired parallel arrangement in response to the control input receiving the resistance adjust signal.

5. The telephony test system as set forth in claim 3, further including:
- a transformer having a first side and a second side, with the first side of the transformer connected in series between the second output of one of the first and second driver circuits and the corresponding one of the tip and the ring; and
- a voice channel having a first input and a first output connectable to the respective DAC and ADC via the first switch, and having a second output and a second input connected across the second side of the transformer, wherein:
  - in response to receiving the first switch configure signal therefor, the first switch selectively connects at least one of the first input of the voice channel and the first output of the voice channel to the respective DAC and ADC;
  - connecting the DAC to the first input of the voice channel enables audio frequency signals to be transmitted to the corresponding one of the tip and the ring via the transformer; and
  - connecting the ADC to the first output of the voice channel enables audio frequency signals to be received from the corresponding one of the tip and the ring via the transformer.

6. The telephony test system as set forth in claim 3, further including a talk/monitor path including another telephone circuit having a tip and a ring, with one of the tip and the ring of the other telephone circuit selectively connectable to the DAC via the first switch and with the other of the tip and the ring of the other telephone circuit selectively connectable to the ADC via the first switch.

7. The telephony test system as set forth in claim 3, further including:
- an alarm circuit connected between the PGA and an output alarm, with the alarm circuit having an input adapted to monitor at least one of an alarm switch and a battery; and
- a control circuit connected to the PGA, wherein:
  - the PGA is adapted to receive from the alarm circuit a signal corresponding to one of a voltage of the battery and a state of the alarm switch;
  - in response to one of (i) the voltage of the battery being less than a desired voltage and (ii) the alarm switch being in predetermined alarm state, the PGA causes the alarm circuit to generate an alarm signal to the output alarm; and
  - the control circuit enables command and control signals to be communicated between the PGA and another system connected to the control circuit.

8. The telephony test system as set forth in claim 3, further including:
- a wideband circuit having a first input and a first output connected to the bus, a second output connectable to the tip of the telephone circuit and a second input connectable to the ring of the telephone circuit; and
- a second switch connected between the second input and the second output of the wideband circuit and the tip and the ring of the telephone circuit, respectively, with the second switch having a control input adapted to receive a second switch configure signal, wherein:
  - in response to receiving the second switch configure signal, the relay selectively connects the tip and the ring of the telephone circuit to one of (i) the second input and the second output of the wideband circuit and (ii) the second input and second output of one of the first and second driver circuit networks.

9. A testing apparatus for testing a telephone circuit, the testing apparatus comprising:
- a controller;
- a driver circuit having an input, an output and a control input adapted to receive an impedance adjust signal;
- a programmable gate array (PGA) connected between the controller and the driver circuit and adapted to receive data and control signals from the controller;
- a digital-to-analog converter (DAC) connected between the PGA and the input of the driver circuit, with the DAC generating to the input of the driver circuit an output voltage corresponding to data received by the DAC from the PGA; and
- an analog-to-digital converter (ADC) connected between the driver circuit and the PGA, with the ADC generating to the PGA data corresponding to a signal received at an input of the ADC from the driver circuit, with the signal received at the input to the ADC corresponding to the response of the telephone circuit to a voltage generated by the driver circuit, wherein:
  - in response to being programmed by the controller, the PGA controls the operation of the DAC and the ADC such that the ADC samples signals received at the input thereof in synchronization with the DAC generating signals to the driver circuit;
  - the driver circuit generates on its output a signal corresponding to the output voltage of the DAC received at the input of the driver circuit and the impedance adjust signal received at the control input; and
  - the driver circuit adapts its output impedance as a function of the impedance adjust signal received at the control input.

10. The testing apparatus as set forth in claim 9, further including a digital signal processor (DSP) connected to the controller and the driver circuit, wherein the controller controls the operation of the PGA and the DSP whereby:
- the PGA provides to the DSP data corresponding to the data received by the PGA from the ADC;
- the DSP mathematically manipulates the data provided thereto from the PGA; and
- the DSP reports the results of the mathematical manipulation to the controller.

11. The testing apparatus as set forth in claim 10, wherein:
the PGA provides a plurality of data to the DSP; and
the mathematical manipulation of data by the DSP includes performing a Fourier Transform on the plurality of data to obtain therefrom an indication of at least one of an amplitude and phase of the signal impressed on the telephone circuit.

12. The testing apparatus as set forth in claim 9, wherein the driver circuit includes:

a first differential amplifier having an inverting input and a noninverting input, with the noninverting input adapted to receive a signal corresponding to a signal output by the DAC;

a multiplying DAC having an input connected to an output of the first differential amplifier and having the control input adapted to receive the impedance adjust signal;

a second differential amplifier having an inverting input and a noninverting input, with the inverting input connected to an output of the multiplying DAC;

a voltage amplifier having an input connected to an output of the second differential amplifier;

a programmable resistor having an input connected to the output of the voltage amplifier, an output connected to the telephone circuit and a control input adapted to receive a resistance adjust signal; and a programmable gain having an input connected to the telephone circuit, a control input adapted to receive a gain adjust signal and an output, wherein:

the ADC, the inverting input of the first differential amplifier and the noninverting input of the second differential amplifier are adapted to receive a signal corresponding to a signal generated at the output of the programmable gain.

13. The testing apparatus as set forth in claim 9, wherein:

the programmable resistor includes a plurality of resistors connected in parallel between the high voltage amplifier and the telephone circuit, with each resistor having a switch connected in series therewith; and the resistance adjust signal received at the control input of the programmable resistor controls each of the plurality of switches to connect at least one of the plurality of resistors between the high voltage amplifier and the telephone circuit.

14. The testing apparatus as set forth in claim 9, further including:

a bus connected between the controller and the driver circuit network;

a wideband circuit having a second DAC having an input connected to the bus, a second ADC having an output connected to the bus and a splitter/combiner connected between the DAC and the telephone circuit and between the ADC and the telephone circuit; and a switch connected between the splitter/combiner and the telephone circuit and between the driver circuit and the telephone circuit, with the switch having a control input adapted to receive a switch configure signal, wherein in response to receiving the switch configure signal, the switch selectively connects the telephone circuit to one of (i) the splitter/combiner and (ii) the driver circuit.

15. A method of testing a tip and a ring of a telephone circuit for a DC delta connected equivalent circuit, the method comprising the steps of:

(a) impressing on the tip a DC voltage $V_{st1}$ and simultaneously impressing on the ring a DC voltage $V_{sr1}$, with the voltage $V_{st1}$ equal to the voltage $V_{sr1}$;

(b) sampling a tip-to-ground voltage $V_{tg1}$;

(c) sampling a ring-to-ground voltage $V_{rg1}$;

(d) impressing on the tip a voltage $V_{st2}$ and simultaneously impressing on the ring a voltage $V_{sr2}$, with the voltage $V_{st2}$ equal to the voltage $V_{sr2}$;

(e) sampling a tip-to-ground voltage $V_{tg2}$;

(f) sampling a ring-to-ground voltage $V_{rg2}$;

(g) determining a ratio $\alpha_t = (V_{tg1} - V_{tg2}) \div (V_{st1} - V_{st2})$;

(h) determining a ratio $\alpha_r = (V_{rg1} - V_{rg2}) \div (V_{sr1} - V_{sr2})$;

(i) determining a tip-to-ground resistance $R_{tg} = \alpha_t(R_{st}) \div (1 - \alpha_t)$ where $R_{st}$ is the tip output impedance;

(j) determining a ring-to-ground resistance $R_{rg} = \alpha_r(R_{sr}) \div (1 - \alpha_r)$ where $R_{sr}$ is the ring output impedance and $R_{st} = R_{sr}$;

(k) determining a foreign tip-to-ground voltage $V_{tf} = (V_{tg1} - \alpha_t V_{st1}) \div (1 - \alpha_t)$;

(l) determining a foreign ring-to-ground voltage $V_{rf} = (V_{rg1} - \alpha_r V_{sr1}) \div (1 - \alpha_r)$;

(m) impressing on the tip a voltage $V_{st3}$ and simultaneously impressing on the ring a voltage $V_{sr3}$, where the voltage $V_{st3}$ and the voltage $V_{sr3}$ are different;

(n) sampling a tip-to-ground voltage $V_{tg3}$;

(o) sampling a ring-to-ground voltage $V_{rg3}$;

(p) determining a tip-to-ring current $I_{tr} = ((V_{st3} - V_{tg3}) \div R_{st}) - ((V_{tg3} - V_{tf}) \div R_{tg})$; and (q) determining a tip-to-ring resistance $R_{tr} = (V_{tg3} - V_{rg3}) \div I_{tr}$.

16. A method of testing a tip and a ring of a telephone circuit for an AC delta connected equivalent circuit, the method comprising the steps of:

(a) impressing on the tip an AC voltage $V_{st}$ and simultaneously impressing on the ring an AC voltage $V_{sr}$, with the frequency, amplitude and phase of $V_{st}$ equal to frequency, amplitude and phase of $V_{sr}$ with the voltage $V_{st}$ having output impedance $R_{st}$ and the voltage $V_{sr}$ having an output impedance $R_{sr}$, and with $R_{st} = R_{sr}$;

(b) determining a peak amplitude $|V_{st}|$ of the voltage $V_{st}$;

(c) determining a peak amplitude $|V_{sr}|$ of the voltage $V_{sr}$;

(d) sampling a tip-to-ground voltage $V_{tg}$;

(e) sampling a ring-to-ground voltage $V_{rg}$;

(f) determining for the voltage $V_{tg}$ a peak amplitude $|V_{tg}|$ and phase $\theta_{tg}$;

(g) determining for the voltage $V_{rg}$ a peak amplitude $|V_{rg}|$ and phase $\theta_{rg}$;

(h) determining a tip-to-ground resistance $R_{tg} = R_{st} \div ((|V_{st}| \div |V_{tg}|) \cos \theta_{tg} - 1)$;

(i) determining a tip-to-ground capacitance $C_{tg} = -|V_{st}| \sin \theta_{tg} \div |V_{tg}| \omega R_{st}$, with $\omega = (2\pi)$(frequency of $V_{st}$ and $V_{sr}$);

(j) determining a ring-to-ground resistance $R_{rg} = R_{sr} \div ((|V_{sr}| \div |V_{rg}|) \cos \theta_{rg} - 1)$;

(k) determining a ring-to-ground capacitance $C_{rg} = -|V_{sr}| \sin \theta_{tg} \div |V_{rg}| \omega R_{sr}$;

(l) adjusting the amplitude of $V_{sr}$ to an amplitude different than the amplitude of $V_{st}$, with the output impedance $R_{st}$ equal to the output impedance $R_{sr}$;

(m) sampling a tip-to-ground voltage $V_{tg}$;

(n) sampling a ring-to-ground voltage $V_{rg}$;

(o) determining for the voltage $V_{tg}$ a peak amplitude $|V_{tg}|$ and phase $\theta_{tg}$;

(p) determining for the voltage $V_{rg}$ a peak amplitude $|V_{rg}|$ and phase $\theta_{rg}$;

(q) determining a source-to-ring conductance $G_{sr} = 1 \div R_{sr}$;

(r) determining a ring-to-ground admittance $Y_{rg} = (\text{Re}) Y_{rg} + j(\text{Im}) Y_{rg} = (1 \div R_{rg}) + j\omega C_{rg}$, with $(\text{Re}) Y_{rg}$ = real component of $Y_{rg}$ and $(\text{Im}) Y_{rg}$ = imaginary component of $Y_{rg}$.

(s) determining a tip-to-ring admittance $$Y_{tr} = (Re)Y_{tr} + j(Im)Y_{tr} = |Y_{tr}|\cos\theta_{Y_{tr}} + j|Y_{tr}|\sin\theta_{Y_{tr}}, \quad \text{where}$$

$$|Y_{tr}| = \frac{|Y_{tg}|\sqrt{((Re)Y_{rg} + G_{sr})^2 + (Im)Y_{rg}^2}}{\sqrt{(|V_{tg}|\cos\theta_{tg} - |V_{rg}|\cos\theta_{rg})^2 + (|V_{tg}|\sin\theta_{tg} - |V_{rg}|\sin\theta_{rg})^2}}$$

and $$\theta_{Y_{tr}} = \frac{\theta_{tg} + \tan^{-1}\left[\frac{(Im)Y_{rg}}{(Re)Y_{rg} + G_{sr}}\right]}{\tan^{-1}\left[\frac{|V_{tg}|\sin\theta_{tg} - |V_{rg}|\sin\theta_{rg}}{|V_{tg}|\cos\theta_{tg} - |V_{rg}|\cos\theta_{rg}}\right]}$$

(t) determining a tip-to-ring resistance $R_{tr} = 1 \div (Re)Y_{tr}$, with $(Re)Y_{tr}$ = the real component of $Y_{tr}$; and (u) determining a tip-to-ring capacitance $C_{tr} = (Im)Y_{tr} \div \omega$, with $(Im)Y_{tr}$ = the imaginary component of $Y_{tr}$.

\* \* \* \* \*

UNITED STATES PATENT AND TRADEMARK OFFICE
CERTIFICATE OF CORRECTION

PATENT NO. : 6,285,744 B1
DATED : September 4, 2001
INVENTOR(S) : Regis J. Nero, Jr. et al.

Page 1 of 1

It is certified that error appears in the above-identified patent and that said Letters Patent is hereby corrected as shown below:

Column 6,
Line 52, "58," should read -- $58_1$ --.
Line 67, "coil 94," should read -- coil $94_1$ --.

Column 7,
Line 41, "control line 5821" should read -- control line $58_{2-1}$ --.

Column 9,
Lines 6 and 9, "relays $138_1$ $138_4$" should read -- $138_1$-$138_4$ --.

Column 10,
Line 11, "$136_1$-$36_4$" should read -- $136_1$-$136_4$ --.

Column 11,
Line 46, "$5_1$" should read -- $58_1$ --.

Column 12,
Line 4, "$\div(V_{stl}\div V$" should read -- $\div(V_{stl}-V$ --.
Line 5, "$R_{tg} = \alpha_r$" should read -- $R_{tg} = \alpha_t$ --.
Line 6, "$\alpha a_r$" should read -- $\alpha_r$ --.
Line 9, after "$\alpha_r$)" insert period (.).
Line 50, "$V_s$)." should read -- $V_{st}$). --.

Column 13,
Line 17, "$Y_r$" should read -- $Y_{tr}$ --.

Signed and Sealed this

Second Day of April, 2002

Attest:

*Attesting Officer*

JAMES E. ROGAN
*Director of the United States Patent and Trademark Office*